United States Patent
Karri et al.

(10) Patent No.: US 11,902,231 B2
(45) Date of Patent: Feb. 13, 2024

(54) DYNAMIC DISPLAY OF IMAGES BASED ON TEXTUAL CONTENT

(71) Applicant: INTERNATIONAL BUSINESS MACHINES CORPORATION, Armonk, NY (US)

(72) Inventors: Venkata Vara Prasad Karri, Visakhapatnam (IN); Akash U. Dhoot, Pune (IN); Sarbajit K. Rakshit, Kolkata (IN); Nitika Sharma, Zirakpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 17/650,911

(22) Filed: Feb. 14, 2022

(65) Prior Publication Data
US 2023/0262014 A1    Aug. 17, 2023

(51) Int. Cl.
*H04L 51/07* (2022.01)
*G06F 40/30* (2020.01)
*G06F 3/01* (2006.01)

(52) U.S. Cl.
CPC .............. *H04L 51/07* (2022.05); *G06F 3/017* (2013.01); *G06F 40/30* (2020.01)

(58) Field of Classification Search
CPC ........... H04L 51/07; G06F 40/30; G06F 3/017
See application file for complete search history.

(56) References Cited

U.S. PATENT DOCUMENTS

| | | | |
|---|---|---|---|
| 11,159,458 B1 * | 10/2021 | Johnson | H04L 51/10 |
| 2009/0193430 A1 * | 7/2009 | Chao | H04L 67/535 |
| | | | 719/313 |

(Continued)

FOREIGN PATENT DOCUMENTS

| | | | | |
|---|---|---|---|---|
| CN | 109670163 B | * | 3/2023 | G06F 40/30 |
| IN | 202011025978 A | | 7/2021 | |

(Continued)

OTHER PUBLICATIONS

Disclosed Anonymously, "A Cognitive Method to Liven Instant Group Chats by Using Context-Sensitive Emojis", IPCOM000252242D, Dec. 30, 2017, 6 Pages. https://priorart.ip.com/IPCOM/000252242.

(Continued)

*Primary Examiner* — James R Sheleheda
(74) *Attorney, Agent, or Firm* — Robert R. Aragona

(57) ABSTRACT

An embodiment for dynamically displaying images based on textual content is provided. The embodiment may include receiving real-time textual content from a sender and a recipient. The embodiment may also include deriving a topic of the real-time textual content and a context associated with the real-time textual content. The embodiment may further include identifying a medium in which the real-time textual content is entered. The embodiment may also include predicting a digital image to be displayed to the sender. The embodiment may further include in response to determining the digital image is available in a digital library, selecting the digital image from the digital library and displaying the selected digital image to the sender. The embodiment may also include validating the selected digital image and displaying the validated selected digital image to the recipient.

20 Claims, 7 Drawing Sheets

(56) References Cited

U.S. PATENT DOCUMENTS

| | | | |
|---|---|---|---|
| 2017/0052946 A1* | 2/2017 | Gu | G06F 40/274 |
| 2017/0083506 A1* | 3/2017 | Liu | G06F 40/30 |
| 2017/0185581 A1* | 6/2017 | Bojja | G06V 30/19173 |
| 2017/0344224 A1* | 11/2017 | Kay | G06F 3/0482 |
| 2018/0255009 A1* | 9/2018 | Chen | G06Q 50/01 |
| 2018/0295072 A1* | 10/2018 | Yim | G06F 3/04817 |
| 2018/0356957 A1* | 12/2018 | Desjardins | G06F 40/274 |
| 2019/0122412 A1* | 4/2019 | Woo | H04L 51/52 |
| 2019/0260701 A1* | 8/2019 | Viklund | H04L 51/18 |
| 2020/0007672 A1* | 1/2020 | Reyes | G02B 27/0172 |
| 2020/0110794 A1* | 4/2020 | Vos | G06F 40/279 |
| 2020/0117707 A1* | 4/2020 | Liu | G06F 3/04817 |
| 2020/0301566 A1* | 9/2020 | Monk | G06F 17/10 |
| 2020/0380199 A1* | 12/2020 | Judovsky | H04L 51/04 |
| 2021/0073249 A1 | 3/2021 | Chang | |
| 2021/0103610 A1* | 4/2021 | Lee | G06F 16/435 |
| 2021/0141866 A1* | 5/2021 | Chen | G06F 40/30 |
| 2021/0192800 A1* | 6/2021 | Dutta | G06F 40/205 |
| 2022/0004872 A1* | 1/2022 | Raja | G16Y 20/00 |
| 2022/0269354 A1* | 8/2022 | Prasad | G06F 40/30 |
| 2022/0334652 A1* | 10/2022 | Bayer | G06F 3/0482 |
| 2022/0343569 A1* | 10/2022 | Karri | G06F 40/129 |
| 2023/0099393 A1* | 3/2023 | Tumuluri | G06F 40/35 704/231 |
| 2023/0197063 A1* | 6/2023 | Greborio | G10L 15/22 704/251 |

FOREIGN PATENT DOCUMENTS

| | | | | |
|---|---|---|---|---|
| WO | WO-2019076286 A1 * | 4/2019 | | G06F 40/20 |
| WO | 2021071231 A1 | 4/2021 | | |

OTHER PUBLICATIONS

Disclosed Anonymously, "Automatic Emoji Generation System Through Social Interactions", IPCOM000259045D, Jul. 5, 2019, 6 Pages. https://priorart.ip.com/IPCOM/000259045.

Laddha, et al., "Understanding Chat Messages for Sticker Recommendation in Messaging Apps", The Thirty-Second Innovative Applications of Artificial Intelligence Conference (IAAI-20), 2020, pp. 13156-13163. https://ojs.aaai.org/index.php/AAAI/article/download/7019/6873.

Mell et al., "The NIST Definition of Cloud Computing", Recommendations of the National Institute of Standards and Technology, NIST Special Publication 800-145, Sep. 2011, 7 pages.

* cited by examiner

DYNAMIC DISPLAY OF IMAGES BASED ON TEXTUAL CONTENT

BACKGROUND

The present invention relates generally to the field of computing, and more particularly to a system for dynamically displaying images based on textual content.

Modern devices have touch display screens and/or keyboards where a user is able to interact with icons and letters on the display screens and/or keyboards with the touch of a finger. Such devices include, but are not limited to, mobile phones, smartwatches, tablets, desktop computers, as well as laptop computers. As text messaging continues to replace live phone calls for most interactions, users of these devices may enhance such interactions with images that convey certain information in lieu of text. For example, emojis, GIFs, and videos may be sent via these devices.

SUMMARY

According to one embodiment, a method, computer system, and computer program product for dynamically displaying images based on textual content is provided. The embodiment may include receiving real-time textual content from a sender and a recipient. The embodiment may also include deriving a topic of the real-time textual content and a context associated with the real-time textual content. The embodiment may further include identifying a medium in which the real-time textual content is entered. The embodiment may also include predicting a digital image to be displayed to the sender based on the topic, the context, and the medium. The embodiment may further include in response to determining the digital image is available in a digital library, selecting the digital image from the digital library and displaying the selected digital image to the sender.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
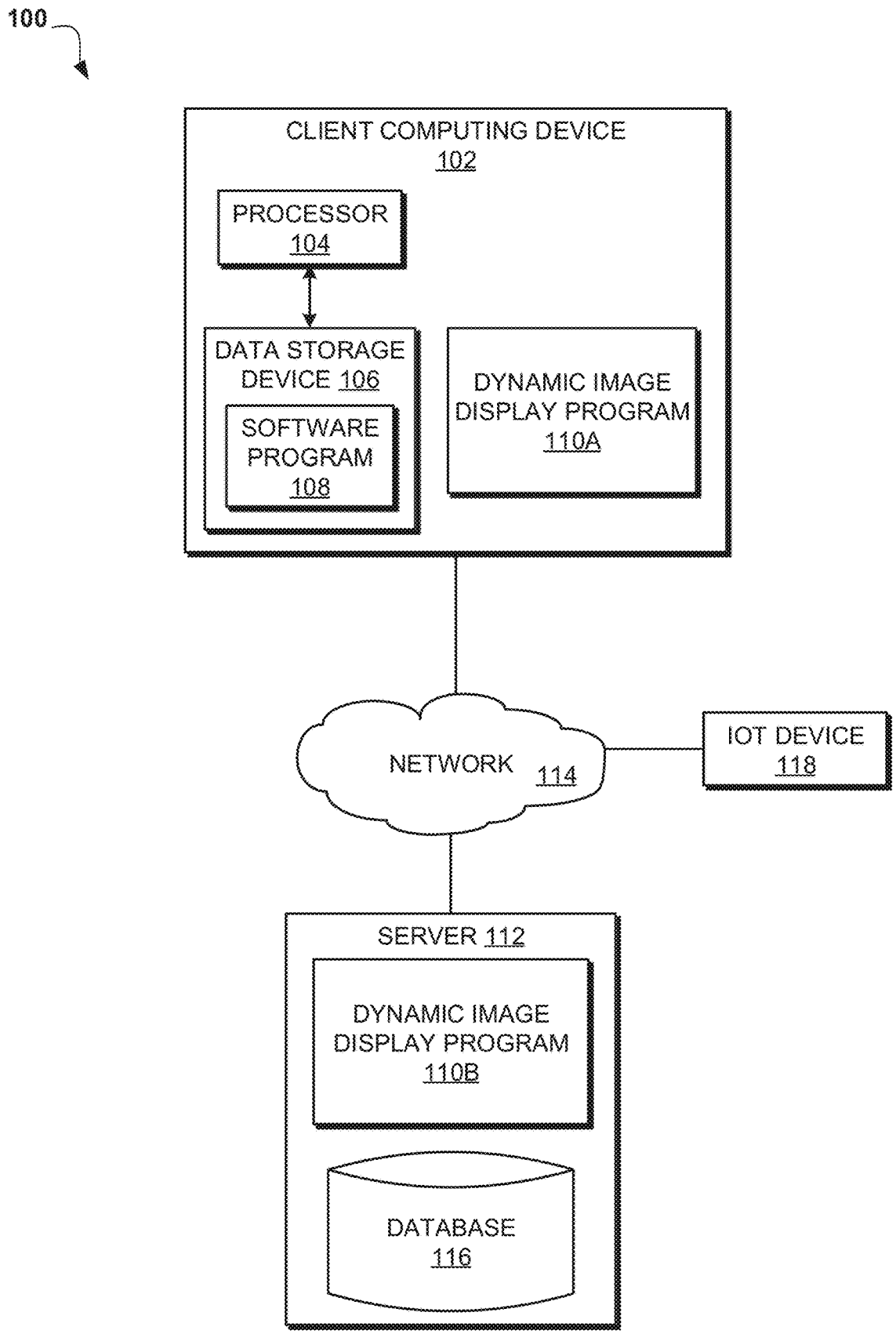
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically displaying images based on textual content. The following described exemplary embodiments provide a system, method, and program product to, among other things, predict an image to be displayed to a sender based on a context associated with real-time textual content and, accordingly, display the predicted image to the sender. Therefore, the present embodiment has the capacity to improve collaboration application technology by dynamically considering complete conversation details when suggesting a digital image to the sender.

As previously described, modern devices have touch display screens and/or keyboards where a user is able to interact with icons and letters on the display screens and/or keyboards with the touch of a finger. Such devices include, but are not limited to, mobile phones, smartwatches, tablets, desktop computers, as well as laptop computers. As text messaging continues to replace live phone calls for most interactions, users of these devices may enhance such interactions with images that convey certain information in lieu of text. For example, emojis, GIFs, and videos may be sent via these devices. Collaborative messaging applications are not always able to accurately suggest a digital image that replaces text. For example, the digital image may be an emoji that replaces certain words in a chat window. This problem is typically addressed by suggesting or displaying the digital image based on the last word typed or entered into the chat window. However, this type of suggestion or display fails to consider the context of the conversation as a whole, which may be different than the context of the last word for which the digital image suggested or displayed. It may therefore be imperative to have a system in place to suggest or display digital images based on the conversation as a whole rather than the last word typed or entered into the chat window. Thus, embodiments of the present invention may provide advantages including, but not limited to, dynamically considering complete conversation details when suggesting or displaying a digital image to the sender, seamlessly transferring digital images between formal and informal contexts, and enabling users to select digital images using augmented reality (AR) devices. The present invention does not require that all advantages need to be incorporated into every embodiment of the invention.

According to at least one embodiment, when a user is interacting with a chat application on a device, real-time textual content from a sender and a recipient may be received in order to derive a topic of the real-time textual content and a context associated with the real-time textual content. Upon deriving the topic and the context, a medium in which the real-time textual content is entered may be identified so that a digital image to be displayed to the sender may be predicted based on the topic, the context, and the medium. According to at least one embodiment, in response to determining the digital image is available in a digital library, the digital image may be selected from the digital library and the selected digital image may be displayed to the sender. According to at least one other embodiment, in response to determining the digital image is not available in the digital library, the digital image may be generated utilizing a generative adversarial network (GAN) and the generated digital image may be displayed to the sender. In either embodiment, the generated or selected digital image may be validated and the validated digital image may be displayed to the recipient. Upon displaying the validated digital image to the recipient, a reply image may be suggested to the recipient based on the validated digital image and the real-time textual content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to predict an image to be displayed to a sender based on a context associated with real-time textual content and, accordingly, display the predicted image to the sender.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a dynamic image display program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a dynamic image display program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, an augmented reality (AR) device such as AR glasses having a camera and/or motion sensors, and/or any other IoT Device 118 known in the art for detecting eye and facial movements that is capable of connecting to the communication network 114, and transmitting and receiving data with the client computing device 102 and the server 112.

According to the present embodiment, the dynamic image display program 110A, 110B may be a program capable of receiving real-time textual content from a sender and a recipient, predicting an image to be displayed to the sender based on a context associated with the real-time textual content, displaying the predicted image to the sender, dynamically considering complete conversation details when suggesting or displaying the image to the sender, seamlessly transferring displayed images between formal and informal contexts, and enabling users to select specific images using AR devices. The dynamic image display method is explained in further detail below with respect to FIGS. 2A and 2B.

Figure 2A:
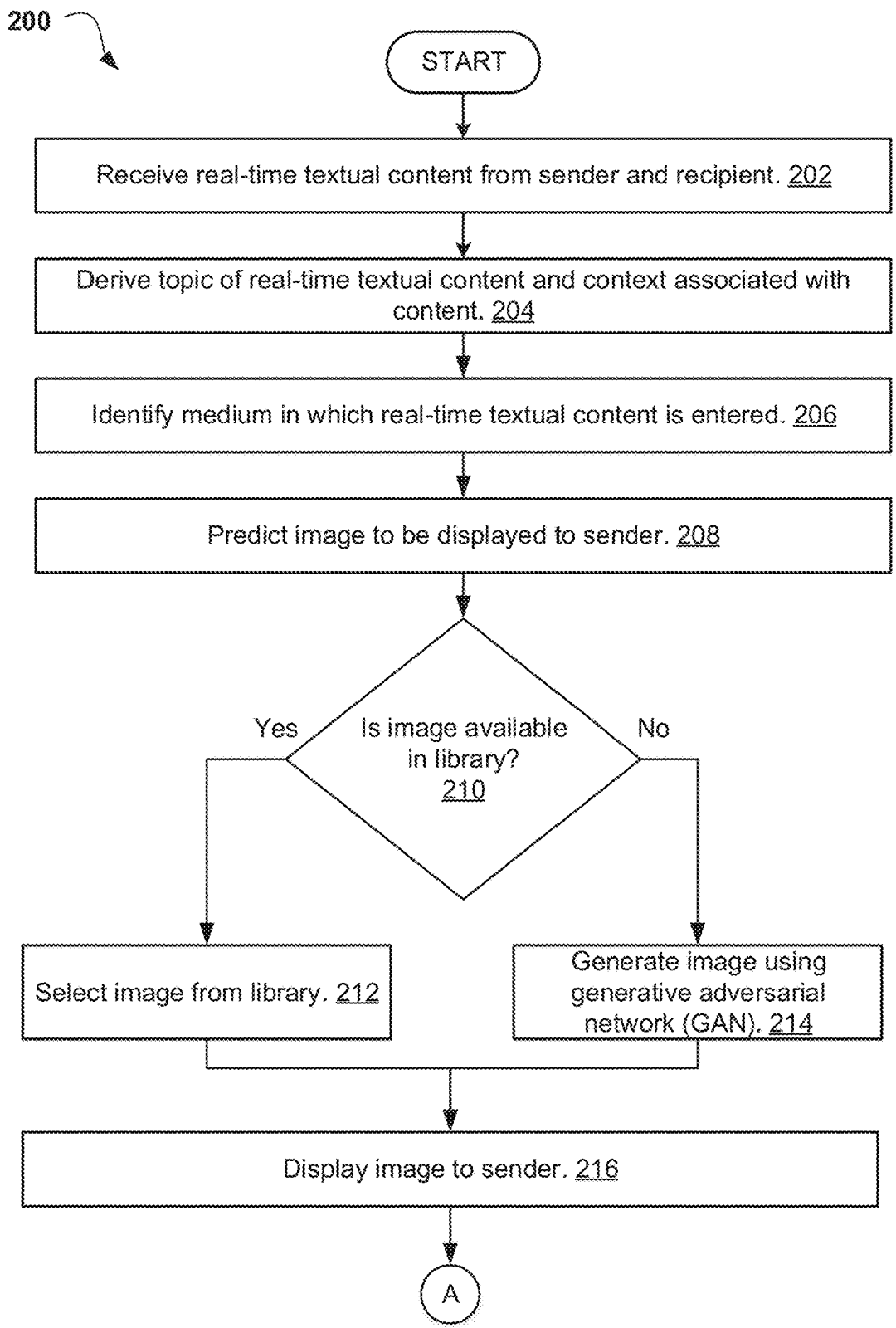
FIGS. 2A and 2B illustrate an operational flowchart for dynamically displaying images based on textual content in a dynamic image display process according to at least one embodiment.
Figure 2B:
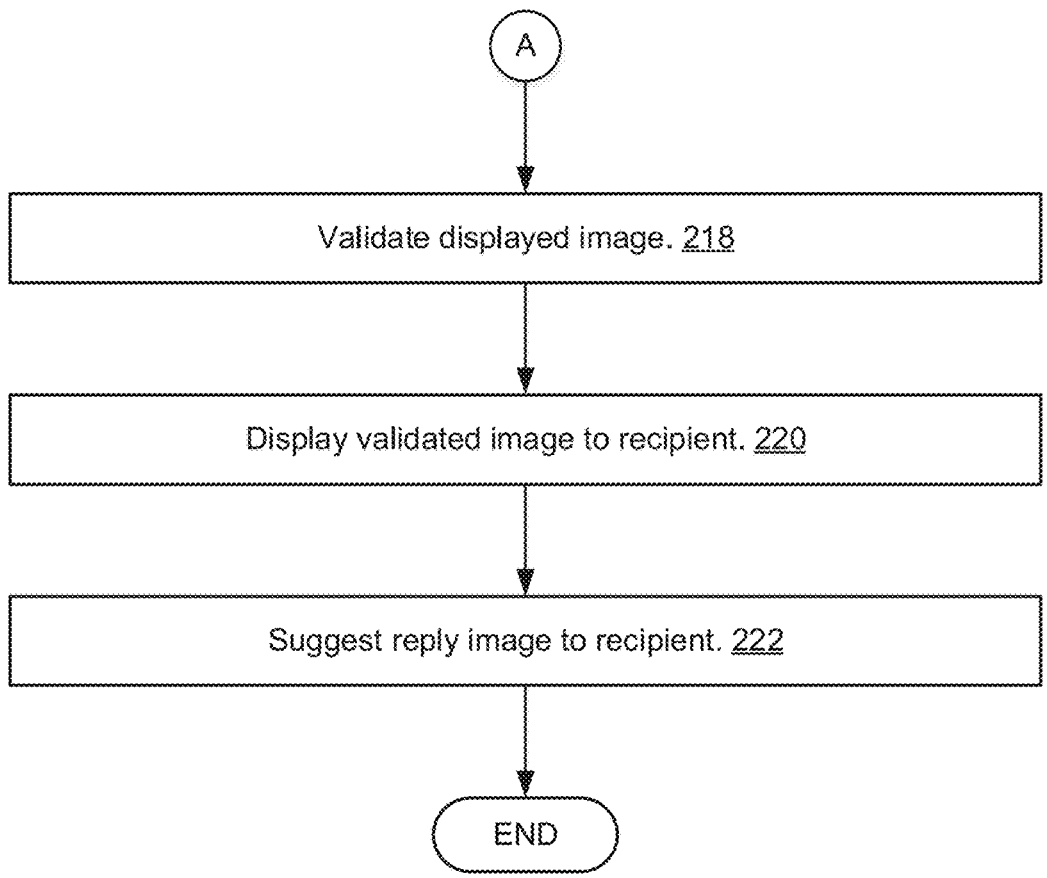

Referring now to FIGS. 2A and 2B, an operational flowchart for dynamically displaying images based on textual content in a dynamic image display process 200 is depicted according to at least one embodiment. At 202, the dynamic image display program 110A, 110B receives the real-time textual content from the sender and the recipient. The sender may be an individual who is entering a message into a collaborative messaging application, and the recipient may be an individual to whom the entered message from the sender is directed. A collaborative messaging application may be a text messaging application or other instant messaging application, an email, a blog, and/or a social media application. For example, in an instant messaging application, the real-time textual content may be entered into a chat window in a back-and-forth pattern between the sender and the recipient, whereas in the email the real-time textual content entered by the sender and the recipient may be grouped as a thread. In another example, in the social media application, the real-time textual content may be entered as comments on a newsfeed and responses to those comments. According to at least one embodiment, historical textual content may also be received by the dynamic image display program 110A, 110B, described in further detail below with respect to step 208.

Then, at 204, the dynamic image display program 110A, 110B derives the topic of the real-time textual content and the context associated with the real-time textual content.

According to at least one embodiment, the context associated with the real-time textual content may be the particular activity in which the sender and/or recipient is engaged. For example, the sender and/or recipient may be eating food, drinking coffee, and/or attending a meeting. The context may be derived when the sender and/or recipient grants permission to share their recent activity, either by sharing location information or allowing the dynamic image display program 110A, 110B access to a calendar. For example, the calendar may indicate that the sender is scheduled to have lunch at 1:00 p.m. Additionally, the context may be derived from other collaborative messaging applications. For example, the sender may post on social media that the user is having lunch at 1:00 p.m. In this example, this post may be shared with the instant messaging application.

According to at least one other embodiment, the topic of the real-time textual content may be the topic the sender and recipient are discussing. For example, if the sender types, "I am hungry," the topic may be food. In another example, the sender may type, "I can't meet tonight because I'm going out shopping later," the topic may be shopping. Additionally, the dynamic image display program 110A, 110B may derive the likes and dislikes of the sender and/or recipient for that topic. Continuing the example above where the sender types, "I am hungry," in a previous sentence the sender may have typed "I don't like pizza." In this example, it may be inferred by the dynamic image display program 110A, 110B that the sender does not like pizza.

According to at least one further embodiment, the dynamic image display program 110A, 110B may access the photo and/or video gallery on a device of the sender and/or recipient, as well as derive certain demographic information of the sender and/or recipient, including, but not limited to, age, gender, and/or geographic area.

Next, at 206, the dynamic image display program 110A, 110B identifies the medium in which the real-time textual content is entered. The medium may be the particular collaborative messaging application in which the real-time textual content is entered. These mediums may either be formal or informal. For example, the formal medium may be a professional medium in which students and business employees communicate. According to at least one embodiment, the professional medium may be identified by a school or workplace name in the medium. For example, the email address of the employee may be "John.Doe@lawfirm.com." In another example, in an instant messaging application, a workplace URL may be used to identify the medium as a professional medium. Continuing the example, the workplace URL may be "company.application.com."

According to at least one other embodiment, the sender and/or recipient may designate the medium as formal or informal.

According to at least one further embodiment, the informal medium may be any other medium that is not tied to a school or workplace. For example, the informal medium may be a collaborative messaging application where friends and family communicate, such as when posting in a newsfeed and commenting on the post. The examples described above with respect to step 206 are not intended to be limiting, and it may be appreciated that in embodiments of the present invention the designation of the medium as formal or informal may be determined in a variety of other ways.

Then, at 208, the dynamic image display program 110A, 110B predicts the digital image to be displayed to the sender. The digital image may be predicted based on the topic of the real-time textual content, the context associated with the real-time textual content, and the medium in which the real-time textual content is entered, as described above with respect to steps 204 and 206. The digital image may be an emoji, a GIF, photograph, a deep fake video, and/or any digital image known in the art that is capable of being shared in collaborative messaging applications.

As described above with respect to step 204, the context associated with the real-time textual content may be the particular activity in which the sender and/or recipient is engaged. For example, the sender and/or recipient may be eating food, drinking coffee, and/or attending a meeting. An appropriate digital image may be predicted that is consistent with this context. For example, if the context indicates that the sender is in a café drinking coffee, when the sender is replying to a message asking, "What are you doing," the sender may begin to type "I am . . . " In this example, the appropriate digital image may be a coffee emoji or a GIF of the sender drinking coffee. Similarly, if the context indicates that the sender is in the library reading, when the sender is replying to a message asking, "Hey, what's up," the sender may begin to type "I am . . . " In this example, the appropriate digital image may be a photograph of the sender reading or a deep fake video of the sender reading.

Also as described above with respect to step 204, the topic of the real-time textual content may be the topic the sender and recipient are discussing. For example, if the sender types, "I am hungry," the topic may be food. An appropriate digital image may be predicted that is consistent with this topic. For example, if the previously typed sentences indicate the sender and/or recipient are discussing food, when the sender is replying to a message asking, "So what are you thinking for dinner," the sender may begin to type "I want . . . " In this example, the appropriate digital image may be a pizza emoji or a GIF of the sender eating pizza. It may be appreciated that in embodiments of the present invention, the digital image may be predicted considering the textual content as a whole, including previous sentences and phrases entered in the collaborative messaging application. Continuing the example above, the sender may have previously stated, "I don't like pizza, but I do like hamburgers." Thus, rather than a pizza emoji or a GIF of the sender eating pizza, the appropriate digital image may be a hamburger emoji or a GIF of the sender eating a hamburger.

Additionally, as described above with respect to step 206, the medium may be the particular collaborative messaging application in which the real-time textual content is entered. These mediums may either be formal or informal. An appropriate digital image may be predicted that is consistent with this medium. Continuing the example described above where the sender and/or recipient are discussing food in an informal medium, the appropriate digital image may be a funny emoji or GIF, illustrated in FIG. 3. Contrarily, where the sender and/or recipient are discussing food in a formal medium, the appropriate digital image may be a more elegant emoji or GIF, also illustrated in FIG. 3.

According to at least one embodiment, the sender may select the specific real-time textual content that is used to predict the digital image, and this selection may be received by the dynamic image display program 110A, 110B. The sender may select only part of a sentence or phrase. For example, since the textual content as a whole may be considered by default, the sender may wish to limit the prediction to non-sensitive subject matter. Continuing the example, the sender may not want sensitive subject matter to be included in the digital image, including, but not limited to, names of relatives, telephone numbers, and/or email addresses.

According to at least one other embodiment, in addition to the real-time textual content, historical textual content from the sender and the recipient may also be used to predict the digital image to be displayed to the sender. The historical textual content may be designated by a particular time period. For example, the historical textual content may be from a date in the past. In another example, the historical textual content may be designated as historical whenever either the sender or recipient exits the collaborative messaging application. The dynamic image display program 110A, 110B may execute a digital twin simulation on the historical textual content from the sender and the recipient. The digital twin simulation may analyze each line of text entered by the sender and the recipient and may generate digital images based on a topic of the historical textual content, a context of the historical textual content, and a medium in which the historical textual content is entered.

The digital images may be generated using a GAN, described in further detail below with respect to step 214. The topic, the context, and the medium of the historical textual content may be derived as described above with respect to step 204. The digital twin simulation may predict a digital image for each sentence or phrase of the historical textual content and consider information including, but not limited to, demographic information of the sender and/or recipient, photos of the sender and/or recipient, as well as likes and dislikes of the sender and/or recipient when generating the digital image.

The dynamic image display program 110A, 110B may tag the digital twin simulation with the topic of the historical textual content, the context of the historical textual content, and the medium in which the historical textual content is entered and store this information as metadata in a database, such as database 116. In addition, the digital images generated during the digital twin simulation may be used to add to and/or build the digital library, described in further detail below with respect to step 210.

The dynamic image display program 110A, 110B may then match the tagged digital twin simulation with the real-time textual content. In particular, the topic, the context, and the medium of the historical textual content may be matched with the topic, the context, and the medium of the real-time textual content. For example, the topic, the context, and the medium of the real-time textual content may be food, reading in the library, and informal, respectively. If the topic, the context, and the medium of the digital twin simulation is also food, reading in the library, and informal, respectively, then the digital image generated during the digital twin simulation may be selected from the digital library when the real-time textual content is entered, described in further detail below with respect to step 212.

According to at least one further embodiment, when the real-time textual content is entered, if there is no match between the tagged digital twin simulation and the real-time textual content, the digital twin simulation may be updated by performing a new digital twin simulation using the real-time textual content as historical textual content.

Next, at 210, the dynamic image display program 110A, 110B determines whether the digital image is available in the digital library. The digital library may be any library containing digital images, including, but not limited to, a photo or video gallery of the sender and/or recipient, a GIF library, a deep fake video library, and an emoji library. This digital library may contain existing digital images, or the digital twin simulation described above with respect to step 208 may add any digital images generated to the digital library. When the digital image to be displayed to the sender is predicted, the dynamic image display program 110A, 110B may scan the digital library for the appropriate digital image.

In response to determining the digital image is available in the digital library (step 210, "Yes" branch), the dynamic image display process 200 proceeds to step 212 to select the digital image from the digital library. In response to determining the digital image is not available in the digital library (step 210, "No" branch), the dynamic image display process 200 proceeds to step 214 to generate the digital image using the GAN.

Then, at 212, the dynamic image display program 110A, 110B selects the digital image from the digital library. According to at least one embodiment, the selected digital image may be an already existing digital image, i.e., a pre-populated digital image. According to at least one other embodiment, where the digital twin simulation has been performed, the digital image selected may have been generated during the digital twin simulation and added to the digital library. In either embodiment, the selected digital image may be displayed to the sender, described in further detail below with respect to step 216.

Next, at 214, the dynamic image display program 110A, 110B generates the digital image. The digital image may be generated utilizing the GAN. The GAN may include a generator and a discriminator. The generator may generate the digital image using as input certain information associated with the sender including, but not limited to, demographic information, photographs, videos, likes and dislikes, and/or location as well as the context, topic, and medium of the real-time textual content. The discriminator may attempt to classify the output digital images as real or fake, i.e., generated by the generator. Once the discriminator is fooled about half the time, the generator is generating adequate digital images which may be displayed to the sender, described in further detail below with respect to step 216. In embodiments of the present invention where the digital twin simulation is performed, the input may include certain information associated with the sender including, but not limited to, demographic information, photographs, videos, likes and dislikes, and/or location as well as the context, topic, and medium of the historical textual content.

Then, at 216, the dynamic image display program 110A, 110B displays the selected or generated digital image to the sender. The selected or generated digital image may be displayed to the sender on a device of the sender, such as on a mobile device, laptop computer, and/or desktop computer. According to at least one embodiment, the selected or generated digital image may be displayed on the AR device, such as AR glasses. According to at least one other embodiment, the dynamic image display program 110A, 110B may inspect the selected or generated digital image for sensitive subject manner and display a warning to the sender when sensitive subject matter is found. If the sender responds that the sender does not want to share the selected or generated digital image, the dynamic image display program 110A, 110B may proceed to select or generate a new digital image that does not incorporate sensitive subject matter.

Next, at 218, the dynamic image display program 110A, 110B validates the selected or generated digital image. The dynamic image display program 110A, 110B may validate the selected or generated digital image by receiving, via the AR device, a gesture from the sender while the sender is wearing the AR device. This gesture may be received, via the AR device, in response to a prompt by the dynamic image display program 110A, 110B. For example, the gesture may be a facial gesture or an eye gesture. The prompt may include highlighting the selected or generated digital image, and when highlighted, the sender may perform the gesture. For example, the sender may move their eyes to the left or right to reject the selected or generated digital image, or the sender may blink to accept the selected or generated digital image.

Then, at 220, the dynamic image display program 110A, 110B displays the validated selected or generated digital image to the recipient. The validated selected or generated digital image may be displayed to the recipient on a device of the recipient, such as on a mobile device, laptop computer, and/or desktop computer. According to at least one embodiment, the validated selected or generated digital image may be displayed on the AR device, such as AR glasses.

According to at least one other embodiment, the validated selected or generated digital image displayed to the recipient may be annotated with text. The annotated text may include the text entered by the sender that has been replaced by the validated selected or generated digital image. For example, the sender may have typed, "I really want to grab pizza after class." However, the recipient may have only received, "I really want [pizza emoji]." The text typed by the sender may be hidden and the annotated text may be displayed to the recipient in response to receiving an action on the validated selected or generated digital image from the recipient. The action may include hovering over the validated selected or generated digital image with a finger or mouse, staring at the validated selected or generated digital image (e.g., when the recipient is wearing the AR device), or long pressing the validated selected or generated digital image. When the recipient performs the action, the annotated text may either be displayed such that the annotated text may be read by the recipient, or the annotated text may be provided to the recipient in audio format (e.g., spoken to the recipient).

Next, at 222, the dynamic image display program 110A, 110B suggests the reply image to the recipient. The reply image may include an emoji, a GIF, photograph, a deep fake video, and/or any digital image known in the art that is capable of being shared in collaborative messaging applications. The reply image may be suggested based on the validated selected or generated digital image and the real-time textual content. For example, if the validated selected or generated digital image is a pizza emoji and it is determined from the real-time textual content that the recipient likes pizza, the suggested reply image may be a thumbs-up emoji and/or a GIF of the recipient with the caption "All RIGHT!" included in the GIF. Continuing the example, if the validated selected or generated digital image is a pizza emoji and it is determined from the real-time textual content that the recipient does not like pizza, the suggested reply image may be a thumbs-down emoji and/or a GIF of the recipient with the caption "NO WAY!" included in the GIF. The examples described above are not intended to be limiting, and it may be appreciated that in embodiments of the present invention a variety of reply images may be suggested to the recipient.

According to at least one other embodiment, the reply image may also be suggested to the recipient based on one or more preferences of the sender. As described above with respect to step 204, the dynamic image display program 110A, 110B may have access to a calendar of the sender as well as other collaborative messaging applications. Preferences of the sender may be obtained from these platforms. For example, the calendar may indicate that the sender typically eats lunch at 1:00 p.m. and every Thursday the sender may post on social media that the sender is eating lunch at a salad bar. Thus, in this example, the suggested reply image may be a salad emoji and/or a deep fake video of the sender eating a salad.

Figure 3:
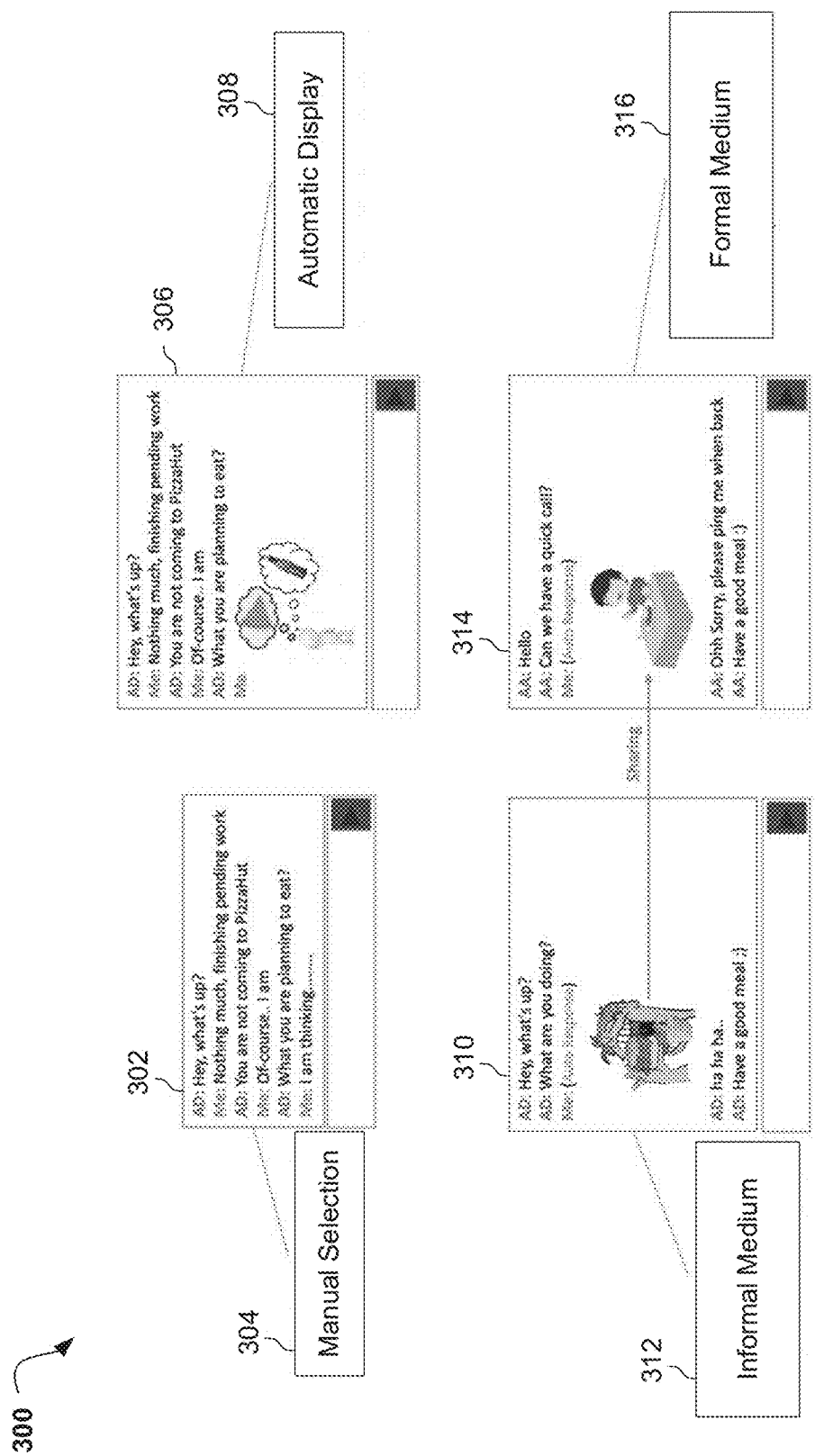
FIG. 3 is an exemplary diagram depicting a textual conversation and images displayed on a graphical user interface (GUI) according to at least one embodiment.

Referring now to FIG. 3, an exemplary diagram 300 depicting a textual conversation and images displayed on a graphical user interface (GUI) is shown according to at least one embodiment. In the diagram 300, several chat windows are illustrated.

A first chat window 302 depicts real-time textual content being entered by the sender and the recipient into a collaborative messaging application without the dynamic image display program 110A, 110B. In the first chat window 302, manual selection 304 of the digital image may be required of the sender.

The second chat window 306 depicts real-time textual content being entered by the sender and the recipient into a collaborative messaging application where the dynamic image display program 110A, 110B is deployed. In the second chat window 306, the digital image may be automatically displayed 308 to the sender and/or recipient. For example, in response to the question, "What are you planning to eat?", the sender may begin to type, "I am eating . . . " The text "I am eating . . . " may be replaced with the digital image, which may show an avatar of the sender thinking along with a digital image of pizza and soda.

The third chat window 310 depicts real-time textual content being entered by the sender and the recipient in an informal medium 312. As described above with respect to FIGS. 2A and 2B, the informal medium 312 may illustrate a funny emoji and/or GIF. The third chat window 310 illustrates a funny emoji of the sender eating a hamburger. According to at least one embodiment, the digital image may be an autoreply by the device of the sender when the sender is busy and has not responded to a message in a predetermined time interval (e.g., five minutes).

The fourth chat window 314 depicts real-time textual content being entered by the sender and the recipient in a formal medium 316. As described above with respect to FIGS. 2A and 2B, the formal medium 316 may illustrate a more elegant emoji and/or GIF. The fourth chat window 314 illustrates an elegant emoji of the sender at a table eating lunch. According to at least one embodiment, the digital image may be transformed when the sender is sharing the digital image from the informal medium 312 to the formal medium 316, and vice versa. In this embodiment, when the sender enters the real-time textual content into the formal medium 316, the digital image displayed in the informal medium 312 may be transformed into an elegant digital image.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
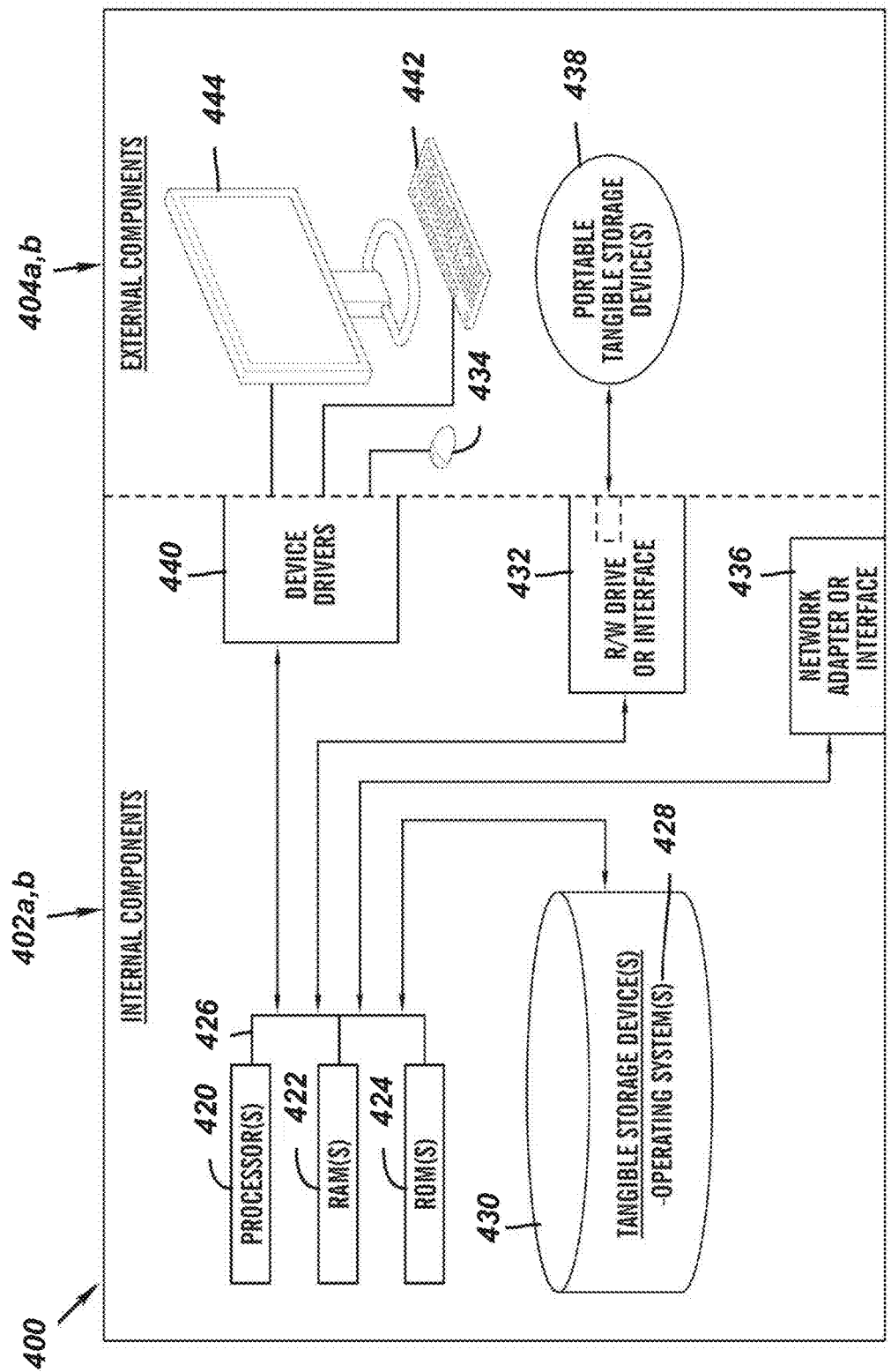
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the dynamic image display program 110A in the client computing device 102 and the dynamic image display program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the dynamic image display program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the dynamic image display program 110A in the client computing device 102 and the dynamic image display program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the dynamic image display program 110A in the client computing device 102 and the dynamic image display program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
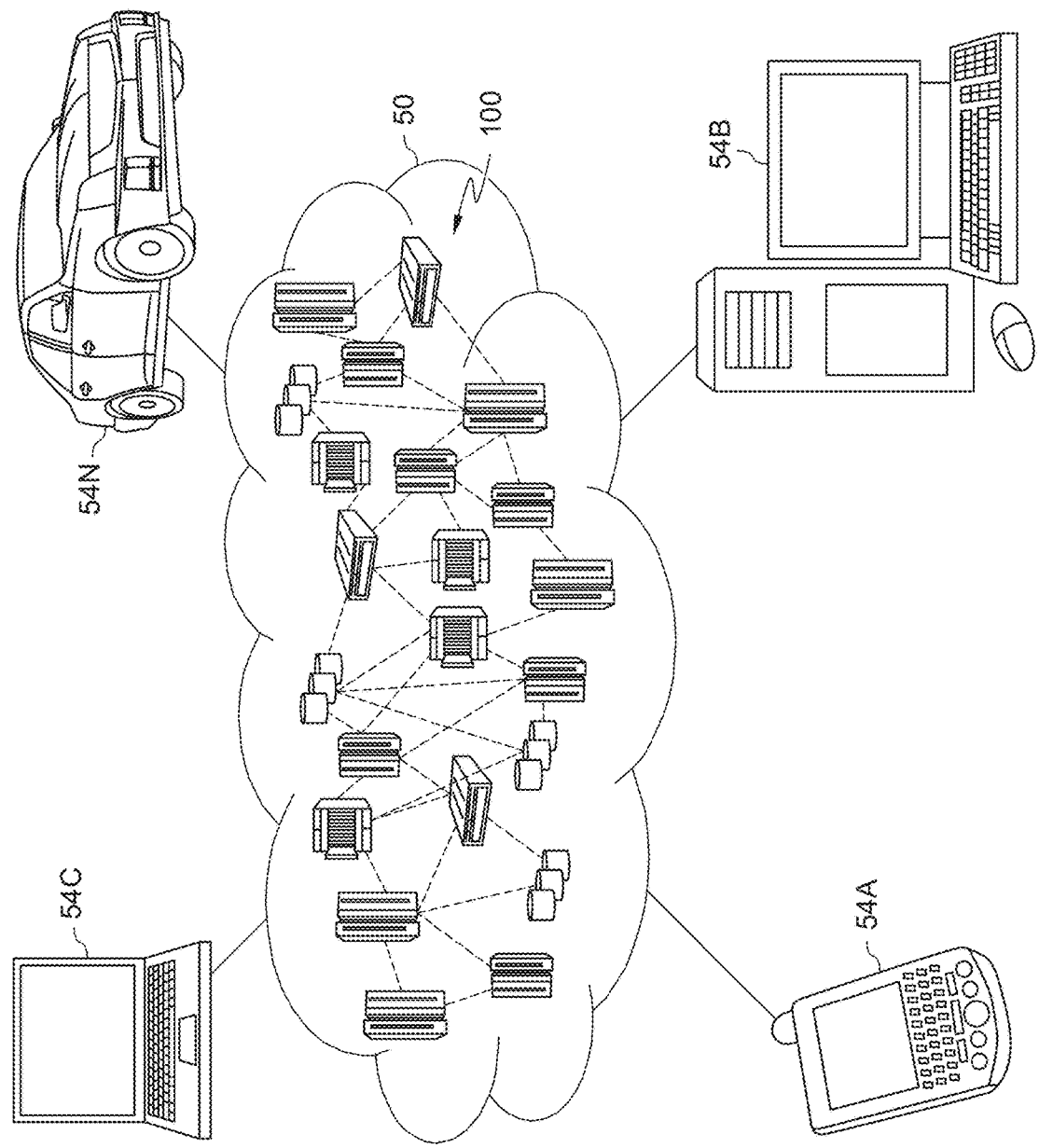
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
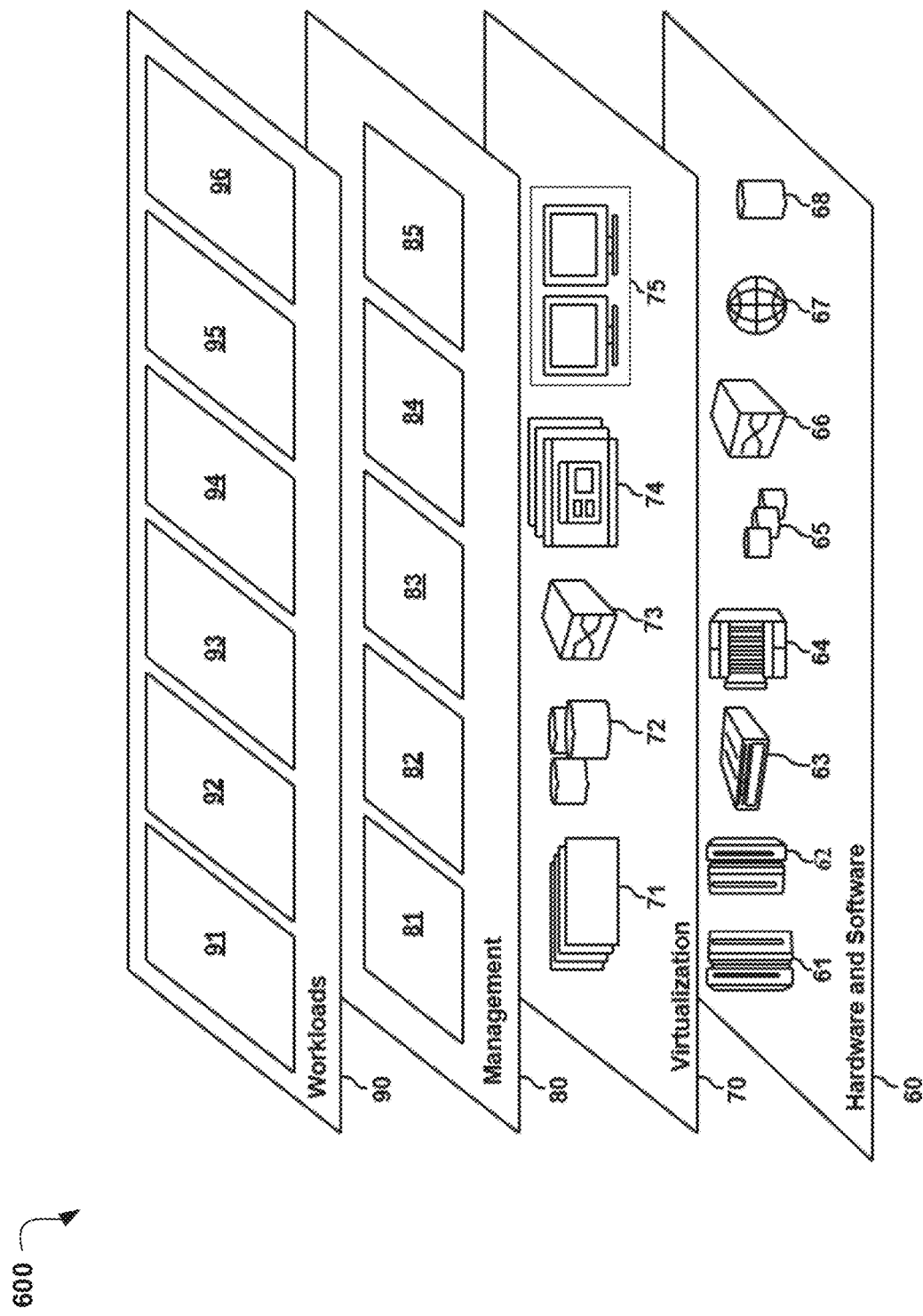
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically displaying images based on textual content 96. Dynamically displaying images based on textual content 96 may relate to predicting an image to be displayed to a sender based on a context associated with real-time textual content in order to display the predicted image to the sender.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically displaying images based on textual content, the method comprising:
receiving real-time textual content and historical textual content from a sender and a recipient communicating via a collaborative messaging application;
deriving a topic of the real-time textual content and a context associated with the real-time textual content;
identifying a medium in which the real-time textual content is entered;
predicting a digital image to be displayed to the sender based on the topic, the context, and the medium, wherein the digital image is predicted by considering the real-time textual content and the historical textual content as a whole including previous sentences and phrases, and wherein the historical textual content is designated as historical in response to the sender or the recipient exiting the collaborative messaging application; and
determining whether the digital image is available in a digital library; and in response to determining the digital image is available in the digital library, selecting the digital image from the digital library and displaying the selected digital image to the sender.

2. The computer-based method of claim 1, further comprising:
in response to determining the digital image is not available in the digital library, generating the digital image utilizing a generative adversarial network (GAN) and displaying the generated digital image to the sender.

3. The computer-based method of claim 1, further comprising:
validating the selected digital image;
displaying the validated selected digital image to the recipient; and
suggesting a reply image to the recipient based on the validated selected digital image and the real-time textual content.

4. The computer-based method of claim 1, wherein predicting the digital image to be displayed to the sender further comprises:
executing a digital twin simulation on the historical textual content from the sender and the recipient, wherein the digital twin simulation analyzes each line of text entered by the sender and the recipient and generates the digital image based on a topic of the historical textual content, a context of the historical textual content, and a medium in which the historical textual content is entered;
tagging the digital twin simulation with the topic of the historical textual content, the context of the historical textual content, and the medium in which the historical textual content is entered; and
matching the tagged digital twin simulation with the real-time textual content.

5. The computer-based method of claim 3, wherein validating the selected digital image further comprises:
receiving, via an augmented reality (AR) device, a gesture from the sender.

6. The computer-based method of claim 3, wherein the reply image is further suggested based on one or more preferences of the sender.

7. The computer-based method of claim 3, wherein the validated selected digital image displayed to the recipient is annotated with text, and further comprises:
displaying the annotated text in response to receiving an action on the validated selected digital image.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving real-time textual content and historical textual content from a sender and a recipient communicating via a collaborative messaging application;
deriving a topic of the real-time textual content and a context associated with the real-time textual content;
identifying a medium in which the real-time textual content is entered;
predicting a digital image to be displayed to the sender based on the topic, the context, and the medium, wherein the digital image is predicted by considering the real-time textual content and the historical textual content as a whole including previous sentences and phrases, and wherein the historical textual content is designated as historical in response to the sender or the recipient exiting the collaborative messaging application;
determining whether the digital image is available in a digital library; and
in response to determining the digital image is available in the digital library, selecting the digital image from the digital library and displaying the selected digital image to the sender.

9. The computer system of claim 8, further comprising:
in response to determining the digital image is not available in the digital library, generating the digital image utilizing a generative adversarial network (GAN) and displaying the generated digital image to the sender.

10. The computer system of claim 8, further comprising:
validating the selected digital image;
displaying the validated selected digital image to the recipient; and
suggesting a reply image to the recipient based on the validated selected digital image and the real-time textual content.

11. The computer system of claim 8, wherein predicting the digital image to be displayed to the sender further comprises:
executing a digital twin simulation on the historical textual content from the sender and the recipient, wherein the digital twin simulation analyzes each line of text entered by the sender and the recipient and generates the digital image based on a topic of the historical textual content, a context of the historical textual content, and a medium in which the historical textual content is entered;
tagging the digital twin simulation with the topic of the historical textual content, the context of the historical textual content, and the medium in which the historical textual content is entered; and
matching the tagged digital twin simulation with the real-time textual content.

12. The computer system of claim 10, wherein validating the selected digital image further comprises:
receiving, via an augmented reality (AR) device, a gesture from the sender.

13. The computer system of claim 10, wherein the reply image is further suggested based on one or more preferences of the sender.

14. The computer system of claim 10, wherein the validated selected digital image displayed to the recipient is annotated with text, and further comprises:
displaying the annotated text in response to receiving an action on the validated selected digital image.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving real-time textual content and historical textual content from a sender and a recipient communicating via a collaborative messaging application;
deriving a topic of the real-time textual content and a context associated with the real-time textual content;
identifying a medium in which the real-time textual content is entered;

predicting a digital image to be displayed to the sender based on the topic, the context, and the medium, wherein the digital image is predicted by considering the real-time textual content and the historical textual content as a whole including previous sentences and phrases, and wherein the historical textual content is designated as historical in response to the sender or the recipient exiting the collaborative messaging application;

determining whether the digital image is available in a digital library; and in response to determining the digital image is available in the digital library, selecting the digital image from the digital library and displaying the selected digital image to the sender.

16. The computer program product of claim 15, further comprising:

in response to determining the digital image is not available in the digital library, generating the digital image utilizing a generative adversarial network (GAN) and displaying the generated digital image to the sender.

17. The computer program product of claim 15, further comprising:

validating the selected digital image;

displaying the validated selected digital image to the recipient; and suggesting a reply image to the recipient based on the validated selected digital image and the real-time textual content.

18. The computer program product of claim 15, wherein predicting the digital image to be displayed to the sender further comprises:

executing a digital twin simulation on the historical textual content from the sender and the recipient, wherein the digital twin simulation analyzes each line of text entered by the sender and the recipient and generates the digital image based on a topic of the historical textual content, a context of the historical textual content, and a medium in which the historical textual content is entered;

tagging the digital twin simulation with the topic of the historical textual content, the context of the historical textual content, and the medium in which the historical textual content is entered; and matching the tagged digital twin simulation with the real-time textual content.

19. The computer program product of claim 17, wherein validating the selected digital image further comprises:

receiving, via an augmented reality (AR) device, a gesture from the sender.

20. The computer program product of claim 17, wherein the reply image is further suggested based on one or more preferences of the sender.

* * * * *